(12) United States Patent
Bull et al.

(10) Patent No.: US 9,490,871 B2
(45) Date of Patent: Nov. 8, 2016

(54) FAULT LOCALISATION

(71) Applicant: BRITISH TELECOMMUNICATIONS PUBLIC LIMITED COMPANY, London (GB)

(72) Inventors: Philip Martin Bull, London (GB); Beum Seuk Lee, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/652,308

(22) PCT Filed: Dec. 6, 2013

(86) PCT No.: PCT/GB2013/000532
§ 371 (c)(1),
(2) Date: Jun. 15, 2015

(87) PCT Pub. No.: WO2014/091180
PCT Pub. Date: Jun. 19, 2014

(65) Prior Publication Data
US 2015/0334225 A1  Nov. 19, 2015

(30) Foreign Application Priority Data
Dec. 13, 2012  (EP) ..................................... 12250180

(51) Int. Cl.
H04M 1/24  (2006.01)
H04M 3/08  (2006.01)
(Continued)

(52) U.S. Cl.
CPC ............... *H04B 3/46* (2013.01); *H04M 3/085* (2013.01); *H04M 3/305* (2013.01)

(58) Field of Classification Search
CPC .......... H04M 3/30; H04M 1/24; H04M 1/74; H04M 3/305; H04M 11/062; H04M 3/085; H04B 3/46; H04L 42/0811; H04L 43/16; B60M 1/14

USPC ................ 379/1.01, 14.01, 15.05, 22.03, 24, 379/29.09, 30
See application file for complete search history.

(56) References Cited

U.S. PATENT DOCUMENTS 4,139,745 A * 2/1979 Ashdown ................ H04M 3/30
                                                     379/24
4,820,991 A * 4/1989 Clark ................... G01R 31/085
                                                     324/519
(Continued)

FOREIGN PATENT DOCUMENTS

WO      WO 01/76207      10/2001

OTHER PUBLICATIONS

International Search Report for PCT/GB2013/000532 mailed Jan. 24, 2014, three pages.
(Continued)

Primary Examiner — Binh Tieu
(74) Attorney, Agent, or Firm — Nixon & Vanderhye P.C.

(57) ABSTRACT

Proposed is an improved method of determining the location of a common fault on a line in a telecommunications network. An overall performance measure is generated for each of the lines in the network based on various electrical measurements, highlighting potentially faulty lines. Nodes within the network also have a performance measure calculated based on the performance measures of the lines passing through the node. Examples of nodes include cross connection points, junction boxes, cabinets, and sections of cabling. A common faulty node is identified from all nodes along a line, based on the overall performance measures associated with those nodes. Then, all other faulty lines running through that node are identified. A distance to fault measurement is estimated for each of the identified faulty lines, using capacitance measurements for each line. A common fault location is determined based on aggregating the estimated distances to fault calculated for each of the identified faulty lines.

5 Claims, 6 Drawing Sheets

(51) Int. Cl.
*H04M 3/22* (2006.01)
*H04B 3/46* (2015.01)
*H04M 3/30* (2006.01)

(56) References Cited

U.S. PATENT DOCUMENTS

| | | | | |
|---|---|---|---|---|
| 5,606,592 | A * | 2/1997 | Galloway | H04M 1/24 |
| | | | | 379/22.03 |
| 5,771,274 | A * | 6/1998 | Harris | H04M 3/2254 |
| | | | | 340/3.43 |
| 5,802,144 | A * | 9/1998 | Laird | H04M 3/2254 |
| | | | | 370/242 |
| 6,026,145 | A * | 2/2000 | Bauer | H04M 3/085 |
| | | | | 324/523 |
| 6,125,458 | A * | 9/2000 | Devan | H04M 3/085 |
| | | | | 370/241 |
| 6,128,753 | A * | 10/2000 | Keeble | H04M 3/085 |
| | | | | 714/25 |
| 6,975,706 | B1 * | 12/2005 | Joffe | H04M 3/085 |
| | | | | 379/14.01 |
| 7,251,754 | B2 | 7/2007 | Maxwell | |
| 7,281,161 | B2 * | 10/2007 | Titmuss | H04L 41/065 |
| | | | | 714/26 |
| 7,282,927 | B1 * | 10/2007 | Burkatovsky | G05B 19/0425 |
| | | | | 324/658 |
| 7,298,149 | B2 * | 11/2007 | Saha | G01R 31/085 |
| | | | | 324/512 |
| 7,573,824 | B2 * | 8/2009 | Maxwell | H04M 3/30 |
| | | | | 370/241 |
| 8,311,409 | B2 * | 11/2012 | Chang | H04B 10/071 |
| | | | | 356/73.1 |
| 2003/0048878 | A1 * | 3/2003 | Drury | H04M 3/085 |
| | | | | 379/14.01 |
| 2003/0063712 | A1 | 4/2003 | Chattell et al. | |
| 2003/0067881 | A1 * | 4/2003 | Lunt | H04M 3/30 |
| | | | | 370/242 |
| 2004/0153855 | A1 * | 8/2004 | Titmuss | H04L 41/065 |
| | | | | 714/43 |
| 2007/0140474 | A1 * | 6/2007 | Fertner | H04M 3/306 |
| | | | | 379/398 |
| 2013/0223599 | A1 * | 8/2013 | Drooghaag | H04B 3/46 |
| | | | | 379/27.01 |
| 2015/0085994 | A1 * | 3/2015 | Koyabe | H04M 3/08 |
| | | | | 379/1.03 |

OTHER PUBLICATIONS

Written Opinion of the ISA for PCT/GB2013/000532 mailed Jan. 24, 2014, five pages.

* cited by examiner

FAULT LOCALISATION

This application is the U.S. national phase of International Application No. PCT/GB2013/000532 filed 6 Dec. 2013 which designated the U.S. and claims priority to EP 12250180.2 filed 13 Dec. 2012, the entire contents of each of which are hereby incorporated by reference.

FIELD OF THE INVENTION

This invention relates to determining the location of a fault in a telecommunications network.

BACKGROUND TO THE INVENTION

In network maintenance, it is critical to localise faults accurately. Faults can occur for a variety of reasons, but precise localisation of these faults has often been a problem. For example, remote testing might suggest a likely fault in a joint somewhere in a PSTN line, but without a precise localisation method, an engineer may have to spend considerable time performing manual testing on the line at various points in order to locate the fault. Accurate fault location information can enable engineers to spend their resources more efficiently, allowing them to put more effort into fixing the faults instead of locating the faults.

A conventional public telecommunications network can generally be described as having two main parts: a core network, and an access network. The access network is the part of the network that extends from the customer premises or terminal equipment to the local exchange. The core network provides services to customers, handles call routing, and other main functions.

In the access network, a communications line is formed of a pair of copper or aluminium wires. Typically each wire passes through a series of nodes between the local exchange and the terminal equipment. Examples of such nodes include cable segments, primary cross-connection points, secondary cross-connection points, distribution points, and joints.

More recently, optical fibres have been used in access networks to replace copper wires, with both copper and optical fibres being used together. Where a communications line consists of an optical fibre, the line will typically pass through several nodes between the local exchange and the terminal equipment. At each node, the incoming fibre from the local exchange is routed, and may be split into a group of outgoing fibres which branch out in various directions. The last part of the circuit to the terminal equipment may still be carried by a pair of copper wires.

Since the components of the access network are those which are most exposed to the elements, this part of the public telecommunications network is particularly prone to faults. In a conventional access network, examples of such faults include: disconnection faults, where the communications line is interrupted between the local exchange and the terminal equipment; short circuit faults, for example electrical leakage between the two wires of a line pair; and earth leakage faults, for example electrical leakage between one of the wires and earth. The causes of the faults include physical damage to a node as well as leakage of water into a node.

To enable a network provider to remedy faults rapidly, local exchanges are provided with line testing apparatus which may be used to test each line. Such tests can be used to determine the approximate location of the fault between the local exchange and the terminal equipment.

EP1269728 describes a system and method for testing a telecommunications network for a fault. Changes in capacitance values of a line are measured and compared to a threshold. If the change exceeds the threshold, then a fault is signalled. A known capacitance length ratio is used to estimate the distance to the fault.

SUMMARY OF THE INVENTION

It is the aim of embodiments of the present invention to provide an improved method of determining the location of a fault on a line in the telecommunications network.

According to one aspect of the present invention, there is provided a method of determining the location of a fault in a telecommunications network, said network comprising a plurality of lines where each line connects an exchange to one of a plurality of customer premises, each line comprising a plurality of nodes through which the line passes, wherein at least some of the nodes are shared between some of the plurality of lines, the method comprising:
(i) determining a line performance measure for each of the plurality of lines based on line characteristics measured for each line;
(ii) identifying a faulty line as a line from the plurality of lines having a line performance measure indicative of a fault;
(iii) identifying a faulty node as the node from the respective plurality of nodes through which the faulty line passes having a node performance measure indicative of a fault, wherein the node performance measure is dependent on the line performance measures of each of the lines individual passing through the identified node;
(iv) identifying suspect lines as lines that pass through the faulty node that have a performance measure indicative of a fault;
(v) estimating a distance to a fault for each of the suspect lines using capacitance measures associated with each of the suspect lines;
(vi) calculating a distance to fault in dependence on the estimated distances from step (v).

The invention has the advantage of increased accuracy in locating a fault, as it allows for a set of affected lines to be used rather than just a single line.

The line characteristics can be derived from electrical measurements taken for each line. The line performance measure can comprise a global indicator based on mapping the line characteristics to a knowledge set of known faults. The line performance measure can also comprise a line specific indicator based on current line characteristics compared to historical line characteristics associated with the line. Use of historical data allows better identification of more recent changes to line conditions.

The invention can be used both reactively to specific reported line problems, and proactively as a general network maintenance tool, looking for potential problems before a customer reports the fault.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention there is proposed an improved method of determining the location of a common fault on a line in a telecommunications network. The method measures various electrical properties of each of a population of lines in the network. An overall performance measure is generated based on the measured electrical properties for each of the lines. The overall performance measure provides an indication of the overall performance of a line, highlighting potentially faulty lines. Overall performance measures are also determined for the various nodes, or sections of the network through which the lines pass. Examples of nodes include cross connection points, junction boxes, cabinets, and sections of cabling. An overall performance measure associated with each node can also be obtained using the individual overall performance measures of the lines passing through the node.

Figure 1:
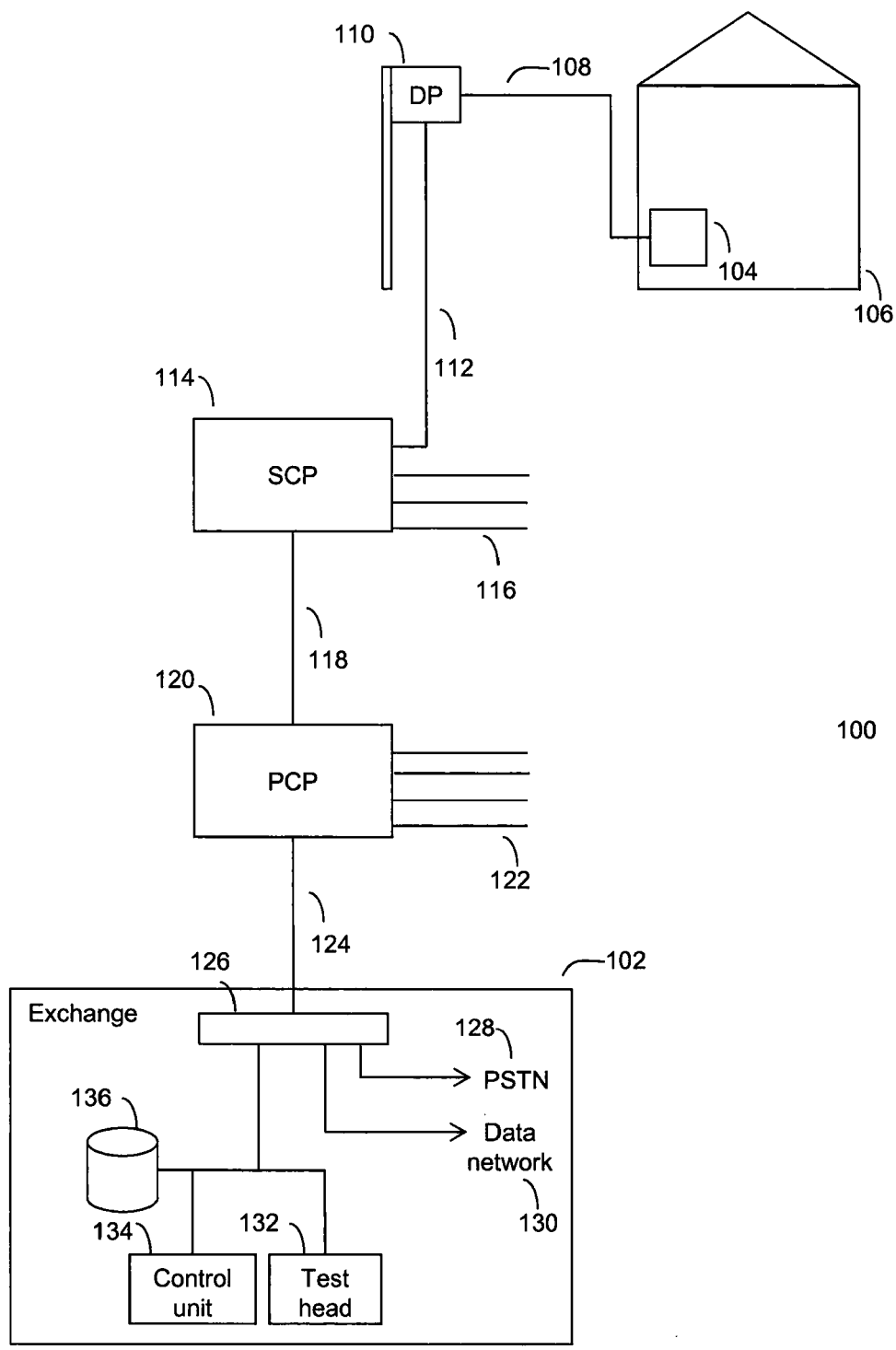
FIG. 1 is a system diagram showing a telephone exchange and connections to a customer premises via a number of nodes.

Then, when a line is reported as being potentially faulty (typically by a customer), the overall performance measure for that line is examined to check whether the testing indicates a potential fault. Assuming the measure does indicate a fault, a common faulty node is identified from all nodes along that line, based on the overall performance measures associated with those nodes. Then, all other faulty lines running through that node are identified. A distance to fault measurement is estimated for each of the identified faulty lines, using capacitance measurements for each line (though other measures can be used). A common fault location is determined based on aggregating the estimated distances to fault calculated for each of the identified faulty lines. FIG. 1 illustrates a telecommunications network 100 including a telephone exchange 102, connected to a customer's terminal equipment 104 at a customer's premises 106. The connection is via a line, typically a twisted copper pair, between the exchange 102 and the customer's terminal equipment 104, where the line runs through a number of different parts of the network, which include a cable section 108 running between the customer's premises 106 and a pole mounted or underground distribution point (DP) 110, a cable section 112 extending from the DP 110 to a secondary cross-connection point (SCP) 114, a cable section 118 extending from the SCP 114 and a primary cross-connection point (PCP) 120, and a cable section extending from the PCP 120 to the exchange 102. A street cabinet is an example of both a SCP and PCP. Whilst only one customer premises and equipment are shown in FIG. 1, it will be appreciated that the network 100 will include other customer premises and associated lines. As shown in FIG. 1, from SCP 114 there are other cable sections 116 containing other lines, which extend to other DPs and on to other customer equipment/premises (not shown). The DP 110 will also have other lines extending from it to other customer premises. Also, extending from PCP 120 are other cable sections 122 to other SCPs (not shown). Thus, cable sections 112, 118 and 124, are each likely to carry many lines.

The cable sections, DPs, SCPs, and PCPs can all be considered as nodes in the network, through which a line may pass. Examples of other nodes include cable segments, a joint in an underground junction box, and other joints. Thus, each line passes through a number of nodes, with some of those nodes being common across a number of lines.

At the exchange, all the lines coming in are aggregated at a switch 126. The switch 126 serves to connect the lines to the PSTN network 128 for voice services, as well as a data network 130 for data services. The switch 126 may also selectively switch in the test head equipment 132. The test head 132 can be brought in circuit with any one of the lines by switching the switch 130 under the control of the control unit 134. The test head equipment 132 performs various measurements on the connected lines as will be described later. Switching over to the test head equipment 132 is usually only from the PSTN service, with any data services being maintained. The test head equipment 132 and switch 130 are controlled by the control unit 134, which typically comprises a processor running a suitably configured computer program. A data store 136 is also provided, which stores measurements from the test head equipment 136, as well as any other data generated by the control unit 134 during operation. The data store is typically a hard disk array or similar.

Figure 2:
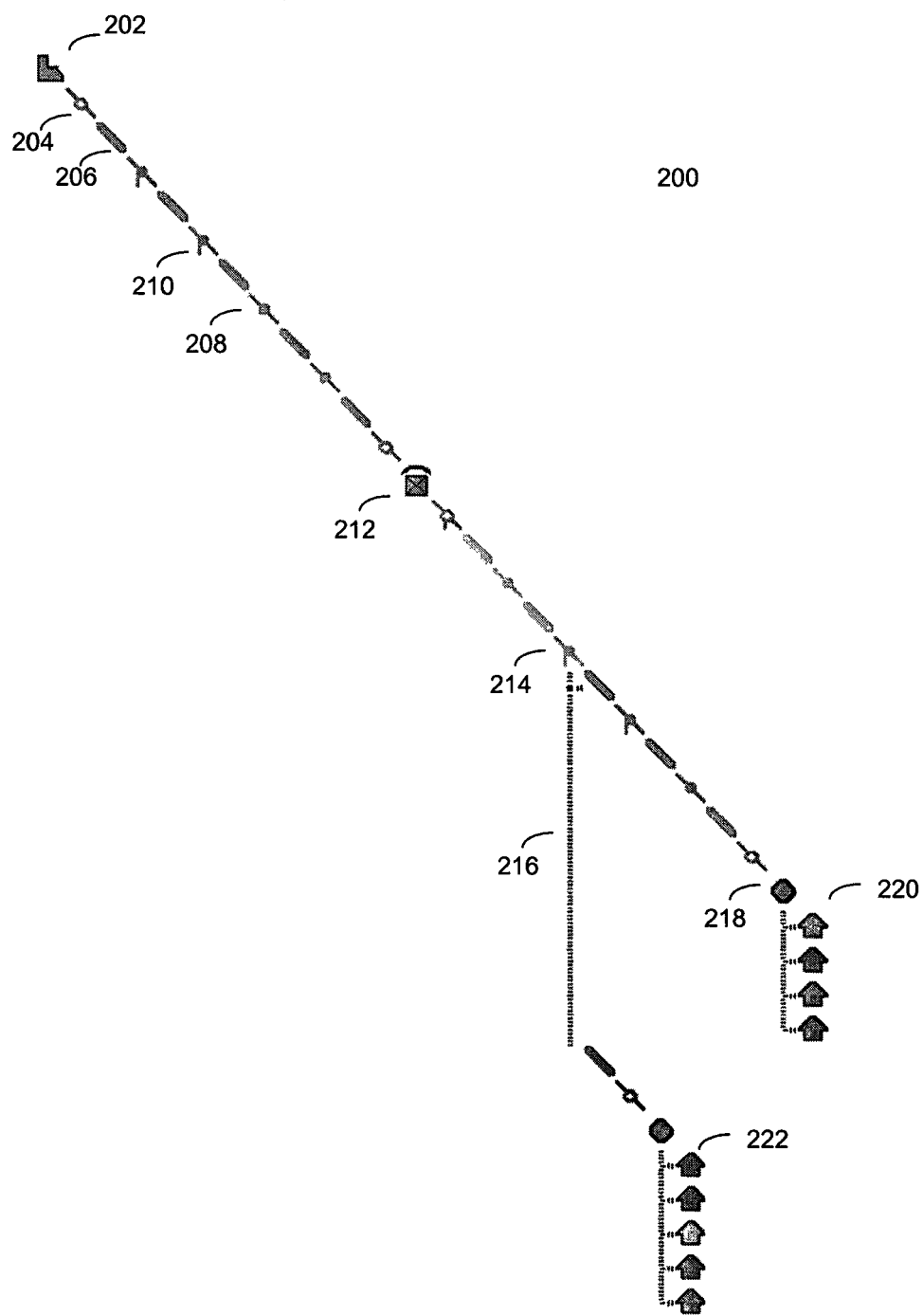
FIG. 2 is network cable diagram showing various types of nodes along sections of cable between an exchange and a number of customer premises.

FIG. 2 is a network cable diagram showing examples of various nodes in a network 200. The network 200 comprises an exchange 202 connecting to two groups of customer premises 220 and 222 via a pair of lines for each of the customer premises. The lines pass through a number of nodes, which include: a termination block (in a main distribution frame here) 204; a cable section 206, a junction 208 connecting cable sections; a cable split junction 210; a PCP cabinet 212; another cable split junction 214 with a split section of cable shown as spur 216; and a DP (over ground or underground) 218. For the sake of simplicity, other customer premises and nodes in the network have not been shown. For example, the cable split junction 210 will have other and nodes connected to it, and ultimately terminate in other customer premises that have not been shown.

The aim of this invention is to identify specifically where and in which node in the network a fault might lie. A line can become faulty for various reasons. For example, the line may become disconnected at any point along the line by accidental severing from neighbouring maintenance work, water ingress at a joint can disrupt the connection, wires in a line can corrode and give rise to electrical conduction problems, and lines can even short circuit with other lines if insulation around the wires is damaged. Even if a faulty node is identified, if the node is a long section of cable, pinpointing the exact location of the fault can be difficult. Examples of the present invention help solve such problems.

Figure 3:
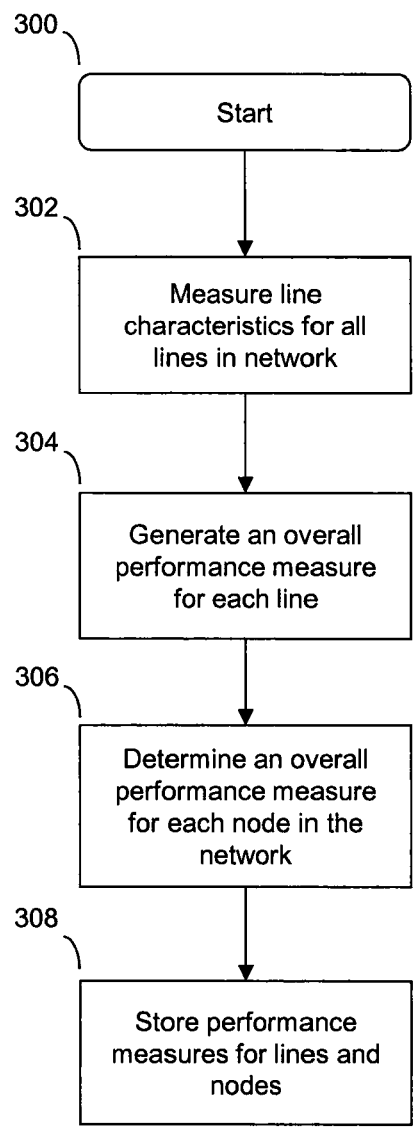
FIG. 3 is a flow chart showing the steps of generating performance measures for lines and nodes in an example of the invention.
Figure 4:
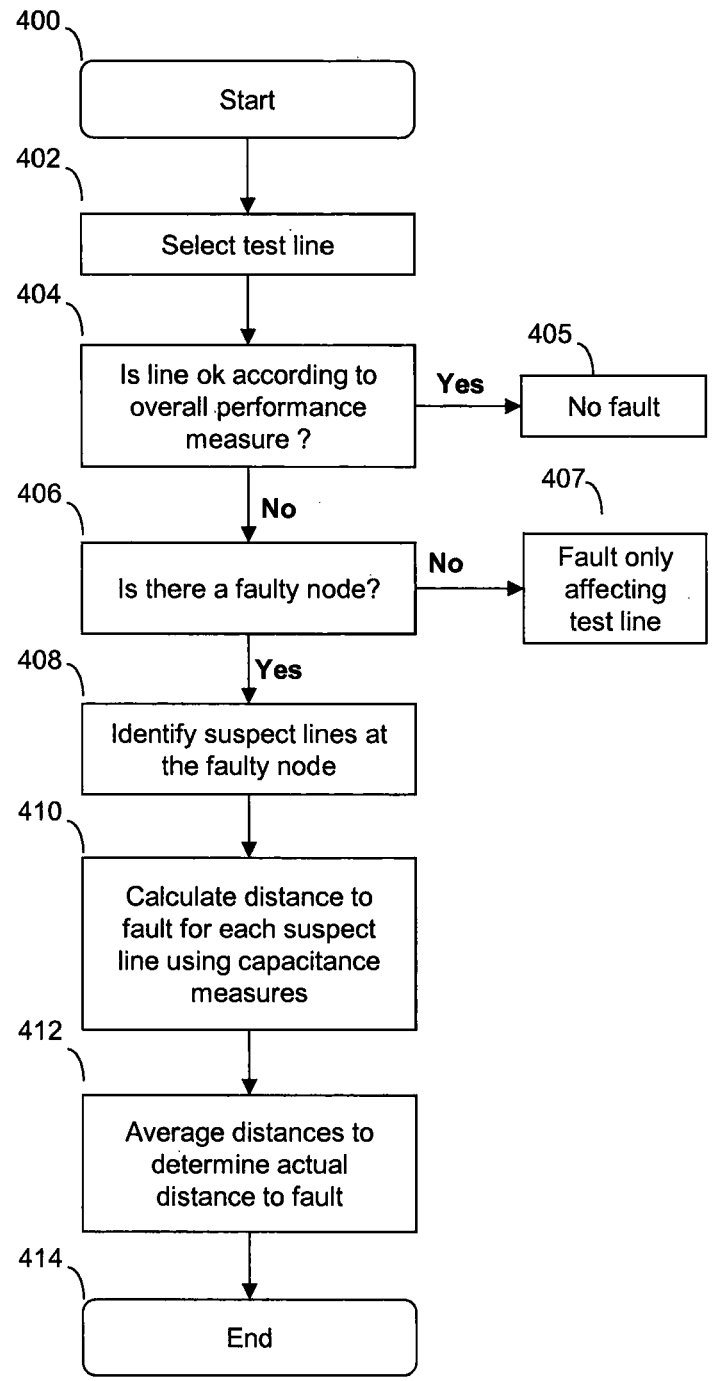
FIG. 4 is a flow chart showing the steps of determining a common fault location in an example of the present invention.

An example of the present invention is set out in the flow charts of FIGS. 3 and 4, and performed by the control unit 134.

Processing starts at step 300 in FIG. 3.

In step 302, electrical characteristics of all the lines in the network are measured by the test head equipment 132. These electrical characteristics include: DC voltage A-to-earth, DC voltage B-to-earth, capacitance A-to-earth, capacitance B-to-earth, capacitance A-to-B, resistance A-to-earth, resistance B-to-earth, and resistance A-to-B. Other characteristics associated with the lines may also be measured. These characteristics are used in step 304 to generate an overall line performance measure using a performance evaluator in the control unit 134, where the overall line performance measure is based on a combination of a number of individual performance measures associated with the line. The measurements are made daily and also on demand in response to a fault report.

Figure 5:
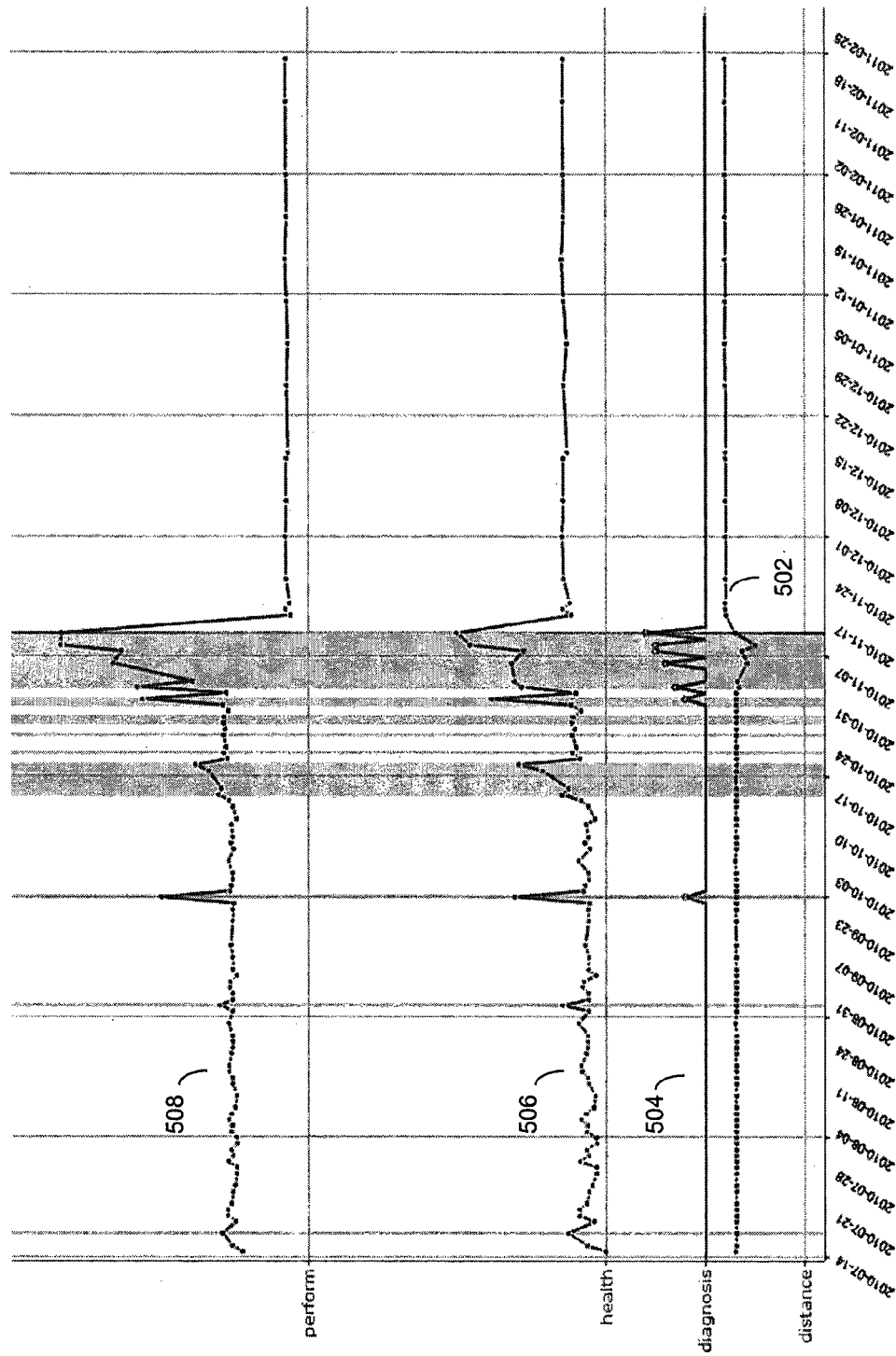
FIG. 5 is a graph showing various performance measures plotted against time for an example line.

FIG. 5 shows a graph of the various performance measures plotted against time for an example line.

The distance performance measure 502, is the "current estimated distance to fault", which is based on the capacitance values measured in step 302, and given here in kilometers. Specifically, the minimum capacitance to earth value is used, taken from the lower of capacitance of A-to-earth value and B-to-earth measurements for the twisted pair from step 302. The relationship between capacitance value and line length can be derived empirically from the line population or calculated more precisely for a specific line if details of the network inventory are known. For example, if we assume that line capacitance is typically 58 nF/km, then a minimum capacitance to earth of 290 nF would result in a "current estimated distance to fault" of 5 km (=290/58). Changes, in particular reductions, to this distance can indicate a potential fault.

The diagnosis measure 504 is indicative of whether there is a faulty condition on the line, based on the measured line characteristics from step 302. Preferably, electrical measurements taken from step 302 are fed into a knowledge set, which maps various values for various electrical measurements to specific faults. The knowledge set is generated from measured properties from a large population of lines mapped onto known faults. In this sense, the diagnosis performance measure can be considered a global performance measure, as it compares a line's individual measurements to a global fault database. Occasionally a test will return a result that falsely indicates a fault condition because of invalid test operation or extraneous conditions not caused by a faulty line. To cope with this type of spurious fail event, a weighting mechanism is used to capture sequential test fails, where a faulty condition occurring within a certain time window of an earlier faulty condition has a cumulative or reinforcing effect on the diagnosis measure. Thus, a single spurious fail event will not result in a significant diagnosis value. For example, in the FIG. 5, the diagnosis value in 2010-10 has a base height whereas a group of values in 2010-11 were weighted according to the number of previous faulty conditions within a certain time frame, resulting in increasingly high diagnosis measures. Using this weighting method, the diagnosis measure captures consistent degradations of a line while de-emphasizing intermittent line conditions. The diagnosis measure in this example typically ranges from 0 to 5, with 0 indicating no fault, and 5 indicating a persistent fault.

Also, when the diagnosis measure indicates no fault, the "current estimated distance to fault" is used as the "baseline distance" or "normal estimated distance".

The health measure 506 is a line-specific performance measure based on the current electrical measurements taken in step 302, compared to the historical baseline measurements from the same line. The baseline measurements are derived from line tests from previous days when the line is in "good" condition according to the global performance measure i.e. the diagnosis measure. The health measure thus gives an indication of how well the line is performing compared to lines own normal performance characteristics, and values in this example range from 0 (good health) to 100 (bad health). In effect, the health measure for a line gives an indication of the stability of that line, based on analysis of the past performance of that line.

The overall line performance measure, labelled as perform measure 508 in FIG. 5, is the aggregated value of the individual distance, diagnosis, and health measures. One way to do this is to apply a suitable coefficient to each of the individual performance measures before they are aggregated.

The overall line performance measure provides an accurate indication of when a line is faulty, taking into account global indicators (diagnosis measure) as well as line specific trends (health measure and distance measure). A line can be classified as being "faulty" if its overall line performance measure exceeds some threshold.

Returning to FIG. 3, in step 306, an overall performance measure for each node in the network is also determined. The overall performance measure for a node is based on the performance measures for each of the lines passing through a given node. One approach is calculate the node performance measure as the average of all the individual overall line performance measures. Another approach is to weight and sum the individual line performance measures to give the node performance measure. Equation (1) below sets out this second approach for determining the performance of a node, $\text{Perform}_{node}$.

$$\begin{aligned} \text{perform}_{node} = &\ A * \text{diagnosis}_{av} * \text{faulty\_lines}_{current} / \text{faulty\_lines}_{typical} + \\ &\ B * \text{health}_{av} * \text{faulty\_lines}_{current} / \text{faulty\_lines}_{typical} + \\ &\ C * \text{change}(\text{estimated\_distance}_{av}, \text{baseline\_distance}_{av}) \end{aligned} \quad (1)$$

where: A, B, and C are coefficients determined experimentally;

$\text{diagnosis}_{av}$ is the average diagnosis measure of all the lines passing through the node;

$\text{faulty\_lines}_{current}$ is the current number of lines classified as being "faulty";

$\text{faulty\_lines}_{typical}$ is the average number of lines classified as being "faulty" taken over a preceding period of time;

$\text{health}_{av}$ is the average health measure of all the lines passing through the node; and $\text{change}(\text{estimated\_distance}_{av}, \text{baseline\_distance}_{av})$ is a function that returns the magnitude of the difference between $\text{estimated\_distance}_{av}$ (the average of the estimated distance to fault for all lines passing through the node) and $\text{baseline\_distance}_{av}$ (the average of the baseline distances of all the lines passing through the node).

Equation (1) includes weightings to $\text{diagnosis}_{av}$ and $\text{health}_{av}$ parameters which are higher when a new fault develops.

The various performance measures for lines and nodes are stored in step 308 in the storage 136, together with the electrical measurements taken in step 302. The steps of FIG. 3 are typically repeated on a daily basis, usually overnight, and performance measures thus also calculated daily.

The overall performance measure for the nodes provides a picture of the network and where potential faults might lie. The aim now is to identify exactly where in each node a fault may lie.

Frequently, a set of faulty lines suffer from a common cause. For example, rain gets into a damaged cable section and affects a set of lines in the cable section. An estimated distance to the fault can be obtained by aggregating the individual fault distances of affected line, rather than using a single line's fault distance.

Firstly, let's consider how the physical distance to a fault might be determined.

When a line is faulty, it is common for its capacitance value (the minimum capacitance to earth) to decrease in proportion to the location of the fault from the exchange. When a line is not in a faulty state, the minimum capacitance to earth value is used to update the baseline capacitance value. Note that this baseline value is used to determine the 'normal estimated distance' corresponding to typical estimated distance between the exchange and the premises as measured according to capacitance described earlier.

Equation 2 below sets out a formula for calculating a physical distance to a fault on a line:

$$\text{Physical distance to fault} = D_{current} \times (\text{physical distance to premises})/D_{normal} \quad (2)$$

Where, $D_{current}$ is the current estimated distance (from capacitance measures), $D_{normal}$ is the normal estimated distance (when a line is in a good condition), and the "physical distance to premises" is the distance of the physical cabling from exchange to premises calculated by summing the individual physical cable lengths. The individual cable lengths are generally recorded when the network is first provisioned, and typically stored in a database.

It should be noted that equation (2) could use the minimum capacitance measures for current and normal conditions instead of distance $D_{current}$ and $D_{normal}$ respectively, as both the distance measures are derived from capacitance measures divided by the capacitance/length factor, e.g. 58 nF. Thus the capacitance factors effectively cancel out in the distances leaving the original capacitances anyway.

FIG. 4 is a flow chart illustrating how a faulty line is identified, with processing starting in step 400.

In step 402, one of the lines in the network is selected for testing. In a reactive system, this would be a line that a customer has reported a fault on. In a proactive system, any line and node in the network can be tested without any specific trigger. The reactive approach is described here and illustrated in FIG. 4.

In step 404, the overall line performance measure, stored in store 136 in step 308, is examined to determine if there is an actual fault condition. This is done by comparing the overall line performance measure to some threshold. If the overall line performance figure suggests that there is no fault condition, and that the line is working fine, then a "no fault" result is returned in step 405. This might occur with certain faults that are not picked up by the overnight line tests. If the overall line performance measure suggests that there is a fault condition on the line, then processing passes to step 406.

In step 406, we determine which of the nodes along the test line is faulty. This is done by examining the performance measure, perform$_{node}$, associated with each of the nodes along the test line, and comparing the measures to a threshold. If a node performance measure exceeds the threshold, then the node is considered to be faulty (i.e. there is likely to be a fault at the node). There will often be more than one faulty node along the test line, as a fault on a line at one node is likely to present itself along the line and into the nodes that follow it (downstream from the exchange to the customer premises). In this reactive method, we look for the node on the test line that is closest to the exchange and has faulty, but also does not have any good, or non-faulty, nodes between it and the customer premises. If there are no such nodes, then the fault is likely to only be affecting the test line. However, the method below for calculating distance to fault still applies (see from step 410 onwards below, but only using measurements for the single test line rather than a group of lines).

Figure 6:
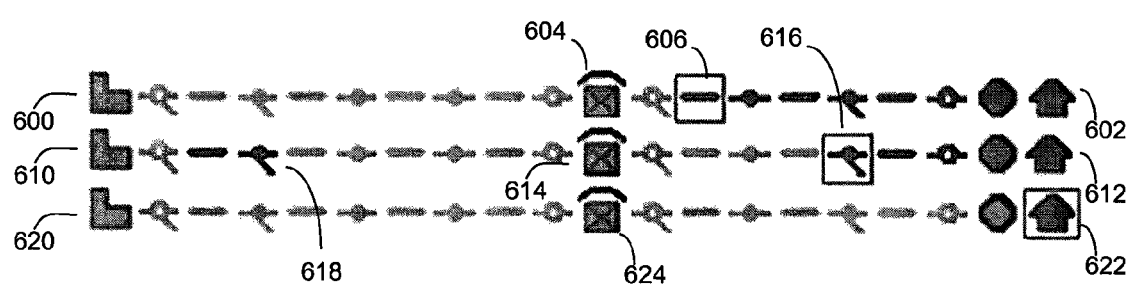
FIG. 6 is a simplified network diagram showing faulty nodes on a number of lines.

FIG. 6 shows 3 lines each exhibiting a fault. The top line runs from the exchange 600 to the customer premises 602 via a cabinet 604. The line has an overall line performance measure indicative of a fault, and a faulty node 606 (a cable section) has been identified, where all the nodes between the faulty node 606 and the customer premises 602 are also considered to be faulty according to their respective node performance measures.

The bottom line runs from the exchange 620 to the customer premises 622 via a cabinet 624. The line has an overall line performance measure indicative of a fault, but none of the nodes along the line are considered to be faulty according to their respective node performance measures. Thus, the fault is identified as being at the customer premises 622.

The middle line runs from the exchange 610 to the customer premises 612 via a cabinet 614. The line has an overall line performance measure indicative of a fault, but there are multiple faulty nodes including cable junction 616 and cable junction 618. The nodes between the cable junction 616 and the customer premises 612 are all faulty, but all the nodes between the cable junction 618 and cable junction 616 are not faulty. Thus, the "faulty node" is identified as cable junction 616 as there are no good nodes between it and the customer premises 612. It is this a fault at this node that is likely to be responsible for the fault experienced at the customer premises 612. The fault at cable joint 618 has not manifested itself along all the nodes along the line towards the customer premises 612, and is likely to be a fault that is affecting lines along another section of cabling, not shown, joined at this node and affecting other customer premises.

Turning now to step 408 once a faulty node has been identified, we identify all the suspected faulty lines that run through the identified faulty node. This is done by examining the overall line performance measures for each of the lines running through the faulty node. Lines that exhibit an overall performance measure above a given threshold are deemed to be faulty lines. The premise is that the set of faulty lines through the faulty node are likely to suffer from the same root cause.

So, in step 410, the physical distance to fault is calculated for each suspect line using equation (2).

In step 412, the actual distance to the fault is determined by averaging the physical distances to fault of all the suspect lines. This actual distance to fault can be used by engineers to pinpoint rectify a fault. For example, if the actual fault distance is calculated as 6 km from exchange, network data on laid cable lengths can be used to identify how far into a section of cable the fault lies. This is particularly useful where a distance to fault lies on a long section of cable. However, even if the fault is around a cabinet, the distance can help identify to which side of the cabinet the fault might lie.

This mechanism of calculating the fault location using other lines suffering from a fault increases the confidence in the fault localisation because a set of lines is used in the calculation instead of a single line. This is especially important considering that capacitance measurements used for determining distance to fault can vary depending on the testing equipment, the line condition, the fault severity, and the type of the fault of a given line.

In the above example, we are trying to identify a faulty node that is responsible for a fault on a given test line, in a so-called reactive system. In a pro-active system, the performance of all nodes can be monitored more generally, and nodes that are faulty can be processed proactively without the initial trigger of a faulty test line. One way to operate such a system is to look for a faulty node (based on its node performance measure) that is closest to the exchange if there are multiple faulty nodes clustered together. Again, this is because a fault close to the exchange is likely to manifest itself along affected lines towards the customer premises. Once such a faulty node has been identified, processing would continue as per the reactive example from step 408 of FIG. 4.

Exemplary embodiments of the invention are realised, at least in part, by executable computer program code which may be embodied in an application program data. When such computer program code is loaded into the memory of a CPU in the control unit 134, it provides a computer program code structure which is capable of performing at least part of the methods in accordance with the above described exemplary embodiments of the invention.

A person skilled in the art will appreciate that the computer program structure referred can correspond to the flow charts shown in FIGS. 3 and 4, where each step of the flow chart can correspond to at least one line of computer program code and that such, in combination with the CPU in the control module 134, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of determining the location of a fault in a telecommunications network, said network comprising a plurality of lines where each line connects an exchange to one of a plurality of customer premises, each line comprising a plurality of nodes through which the line passes, wherein at least some of the nodes are shared between some of the plurality of lines, the method comprising:
   (i) determining a line performance measure for each of the plurality of lines based on line characteristics measured for each line;
   (ii) identifying a faulty line as a line from the plurality of lines having a line performance measure indicative of a fault;
   (iii) identifying a faulty node as the node from the respective plurality of nodes through which the faulty line passes that has a node performance measure indicative of a fault, wherein the node performance measure is dependent on the line performance measures of each of the lines individual passing through the identified node;
   (iv) identifying suspect lines as lines that pass through the faulty node that have a performance measure indicative of a fault;
   (v) estimating a distance to a fault for each of the suspect lines in dependence on the physical distance to the premises and capacitance measures for normal and current conditions associated with each of the respective suspect lines; and
   (vi) calculating a distance to fault in dependence on the estimated distances from step (v).

2. A method according to claim 1, wherein the line characteristics are derived from electrical measurements taken for each line.

3. A method according to claim 1, wherein the line performance measure comprises a global indicator based on mapping the line characteristics to a knowledge set of known faults.

4. A method according to claim 1, wherein the line performance measure comprises a line specific indicator based on current line characteristics compared to historical line characteristics associated with the line.

5. A method according to claim 1, wherein identifying a faulty line comprises comparing the line performance measure with a threshold value.

* * * * *